United States Patent
Budde et al.

(10) Patent No.: US 7,663,841 B2
(45) Date of Patent: Feb. 16, 2010

(54) RESONANCE CONTROL FEATURES FOR A HEAD GIMBAL ASSEMBLY

(75) Inventors: Richard A. Budde, Plymouth, MN (US); Kurt J. Korkowski, Carver, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 425 days.

(21) Appl. No.: 11/068,282

(22) Filed: Feb. 28, 2005

(65) Prior Publication Data

US 2006/0193085 A1    Aug. 31, 2006

(51) Int. Cl.
G11B 5/48    (2006.01)
G11B 21/21    (2006.01)

(52) U.S. Cl. .................. 360/244.5; 360/245.2

(58) Field of Classification Search ......... 360/244.2, 360/244.5, 244.8, 244.9, 245.2, 245.4, 265.9, 360/266.1; 720/684, 687, 692
See application file for complete search history.

(56) References Cited

U.S. PATENT DOCUMENTS

| | | | | |
|---|---|---|---|---|
| 4,870,525 A * | 9/1989 | Wong et al. | ............. | 360/137 |
| 4,982,300 A * | 1/1991 | Forbord | ............. | 360/264.7 |
| 5,185,683 A * | 2/1993 | Oberg et al. | ............. | 360/244.6 |
| 5,208,712 A * | 5/1993 | Hatch et al. | ............. | 360/98.01 |
| 5,313,355 A * | 5/1994 | Hagen | ............. | 360/244.5 |
| 5,715,117 A * | 2/1998 | Brooks | ............. | 360/244.5 |
| 5,808,835 A * | 9/1998 | Fujiwara | ............. | 360/244.7 |
| 5,812,343 A * | 9/1998 | Budde et al. | ............. | 360/244.6 |
| 5,936,803 A * | 8/1999 | Berding | ............. | 360/244.8 |
| 6,014,290 A * | 1/2000 | Supramaniam et al. | .. | 360/245.9 |
| 6,064,550 A * | 5/2000 | Koganezawa | ............. | 360/294.3 |
| 6,072,664 A * | 6/2000 | Aoyagi et al. | ............. | 360/244.5 |
| 6,201,664 B1 * | 3/2001 | Le et al. | ............. | 360/244.9 |
| 6,215,624 B1 * | 4/2001 | Summers et al. | ............. | 360/244.5 |
| 6,362,936 B2 * | 3/2002 | Inoue et al. | ............. | 360/244.2 |
| 6,392,844 B1 * | 5/2002 | Summers | ............. | 360/245.5 |
| 6,512,657 B2 * | 1/2003 | Heist et al. | ............. | 360/244.6 |
| 6,556,383 B2 * | 4/2003 | Murphy et al. | ............. | 360/244.9 |
| 6,634,084 B1 * | 10/2003 | Schmidt et al. | ............. | 29/603.03 |
| 6,738,226 B1 | 5/2004 | Bhattacharya et al. | | |
| 6,865,058 B2 * | 3/2005 | Kube et al. | ............. | 360/244.5 |
| 6,870,708 B1 * | 3/2005 | Fossum et al. | ............. | 360/244.5 |
| 6,956,723 B2 * | 10/2005 | Suzuki | ............. | 360/255 |
| 7,035,054 B2 * | 4/2006 | Honda et al. | ............. | 360/265.9 |
| 7,068,469 B2 * | 6/2006 | Kuwajima et al. | ............. | 360/244.5 |
| 7,207,097 B2 * | 4/2007 | Detjens et al. | ............. | 29/603.06 |
| 7,218,479 B2 * | 5/2007 | Kuwajima et al. | ............. | 360/244.5 |
| 2003/0086206 A1 * | 5/2003 | Kube et al. | ............. | 360/244.5 |
| 2003/0169537 A1 | 9/2003 | Weichelt | | |
| 2003/0231431 A1 | 12/2003 | Bhattacharya et al. | | |
| 2003/0231432 A1 | 12/2003 | Bhattacharya et al. | | |
| 2004/0070882 A1 | 4/2004 | Wada et al. | | |
| 2004/0090711 A1 * | 5/2004 | Kuwajima et al. | ............. | 360/244.8 |
| 2004/0184193 A1 * | 9/2004 | Honda et al. | ............. | 360/244.2 |

* cited by examiner

*Primary Examiner*—Brian E Miller
(74) *Attorney, Agent, or Firm*—Kinney & Lange, P.A.

(57) ABSTRACT

The present invention provides an interface for improving resonance control. The interface includes a first member having a first coupling portion, a mounting surface having a second coupling portion for coupling to the first coupling portion of the first member, and a raised engagement member located on at least one of the first member or the mounting surface. The raised engagement surface provides contact between the first member and the mounting surface.

13 Claims, 6 Drawing Sheets

RESONANCE CONTROL FEATURES FOR A HEAD GIMBAL ASSEMBLY

BACKGROUND OF THE INVENTION

The present invention relates to resonance control features for a head gimbal assembly (HGA). More particularly, the present invention relates to a mounting interface having raised locations for improving the boundary connection between the head gimbal assembly and a mounting surface. For example, the mounting surface can include a test block or an actuator arm.

Disc drives are well known in the art and can comprise several discs, each disc having concentric data tracks for storing data. A transducing head carried by a slider is used to read from or write to a data track on the disc. An HGA includes a slider that glides above the surface of the disc as the disc is spun. The slider is positioned above a data track on the disc by moving the actuator arm (on which the HGA and slider are suspended) using a large scale actuation motor, such as a voice coil motor.

The HGA is attached to the actuator arm. As the HGA is moved by the actuator arm, the HGA experiences vibration and reaches certain structural resonance modes. Such structural resonance modes may adversely affect the performance of the transducing head.

Attempts to control these resonance modes have used a variety of methods, including physical dampers, or software to compensate for the resonance modes. However, any time an unpredictable resonance mode is experienced, the performance of the slider and the transducing head may be compromised. Similarly, complex resonance modes increase the complexity of the disc drive system, by requiring damping mechanisms, different servo control design, or software to compensate for the resonance modes.

Thus, there is a need in the art for a head gimbal assembly having improved resonance control features.

BRIEF SUMMARY OF THE INVENTION

The present invention provides an interface for improving resonance control. The interface includes a first member having a first coupling portion, a mounting surface having a second coupling portion for coupling to the first coupling portion of the first member, and a raised engagement member located on at least one of the first member or the mounting surface. The raised engagement surface provides contact between the first member and the mounting surface.

Further, a head gimbal assembly according to the present invention includes a surface, an attachment portion for coupling the head gimbal assembly to another object, and at least one elevated structure on the surface for contacting and controlling resonance of the head gimbal assembly.

In addition, a method of resonance control includes providing a first interconnecting member that includes at least one raised contact area, and coupling the first interconnecting member to a mounting surface, wherein the mounting surface contacts the at least one contact area.

DETAILED DESCRIPTION

Figure 1:
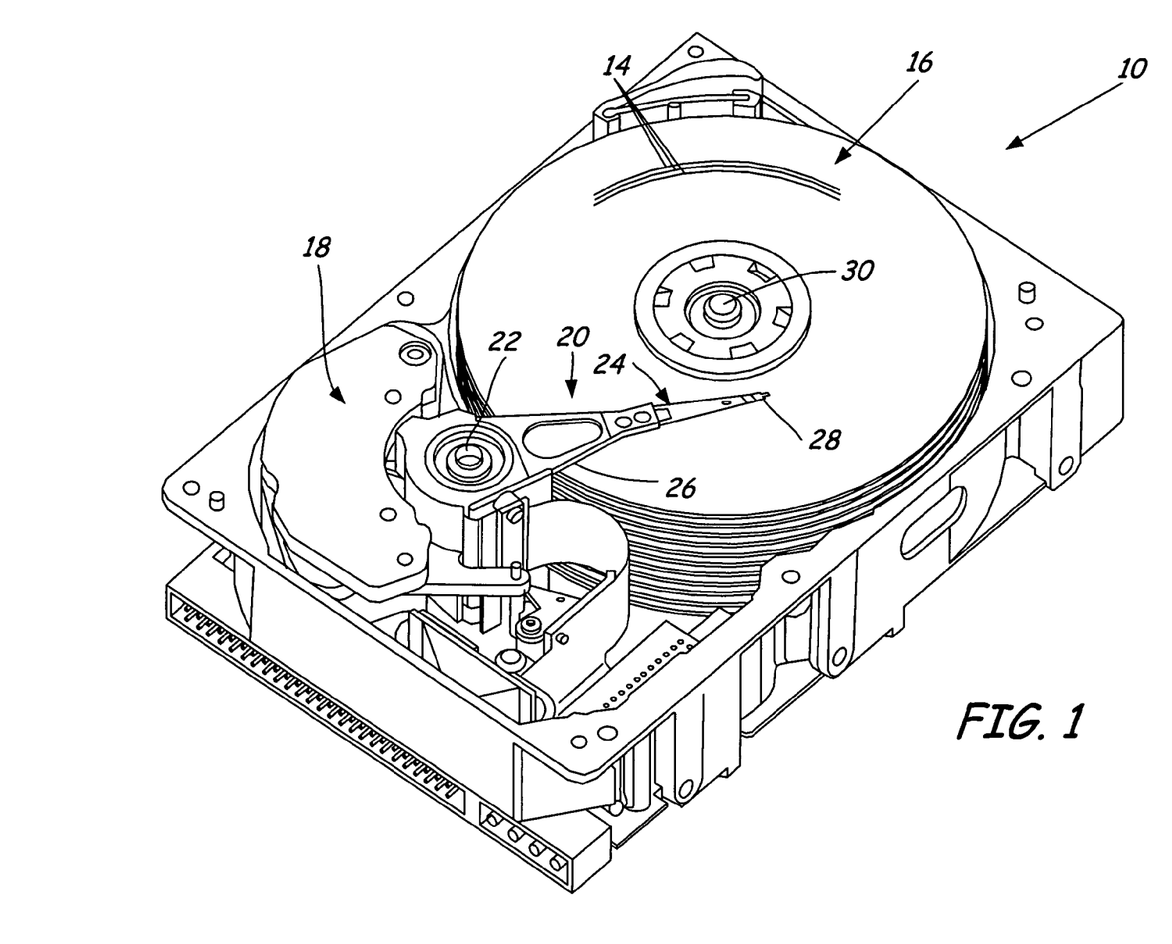
FIG. 1 is a perspective view of a disc drive actuation system for positioning a slider over a disc.

FIG. 1 is a perspective view of a disc drive actuation system 10 for positioning a slider 28 over selected data tracks 14 of a magnetic storage medium 16, such as a disc. The actuation system 10 includes a voice coil motor (VCM) 18 arranged to rotate an actuator assembly 20 about an axis 22. The actuator assembly 20 includes a head gimbal assembly (HGA) 24 connected to an actuator arm 26 (also referred to as an E-block arm 26). The HGA 24 includes a slider 28, which carries a transducer (not shown) for reading and/or writing data on the concentric tracks 14 of the disc 16.

The disc 16 rotates around an axis 30, which causes the slider 28 to fly a small distance above the surface of the disc 16. The distance the slider 28 flies above the surface of the disc 16 is called a fly height. It is desired to control the fly height of the slider 28 very closely, because the fly height affects the performance of the transducing head carried by the slider 28.

As the VCM 18 moves, the actuator arm 26 positions the slider 28 over various tracks 14 of the disc 16, and components such as the arm 26, and/or HGA 24 may vibrate and reach certain natural resonance frequencies. Such vibrations and resonance modes affect the servo tracking capability of the slider 28, which can contribute to reading and writing errors. To ensure the transducer is able to function properly, it is desirable to reduce any resonance experienced by the HGA 24. In particular, it has been discovered that certain types of HGAs experience an unpredictable resonance mode at about 15 kilohertz (kHz).

Figure 2A:
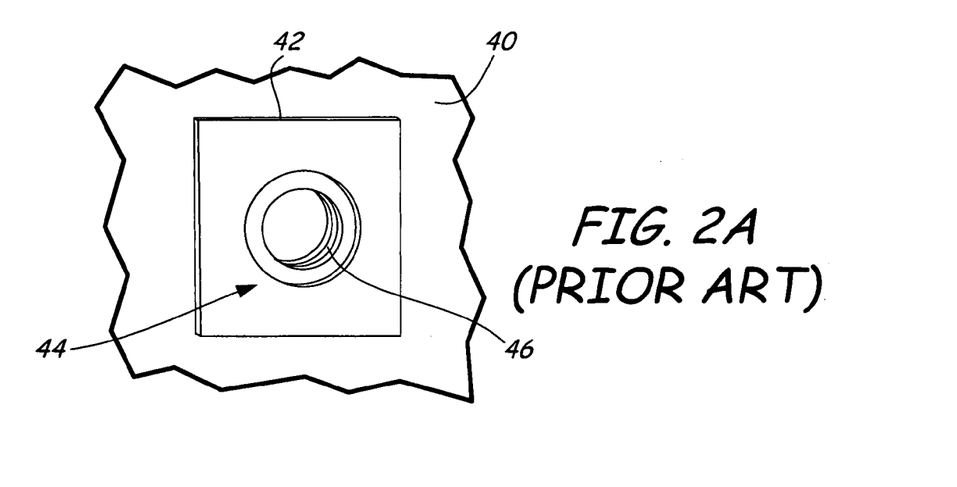
FIG. 2A is a top view of a prior art mounting surface.

FIG. 2A is a top view of a mounting surface that can be coupled to a HGA. In particular, FIG. 2A illustrates a block 40 and raised mounting surface 42. In the middle of the mounting surface 42 is a circular hole 44, which allows access to a threaded bore 46 in the block 40. A HGA can be mounted to the block 40 at the mounting surface 42 by inserting a screw through the HGA and screwing the HGA to the test block 40 using the threaded bore 46.

Figure 2B:
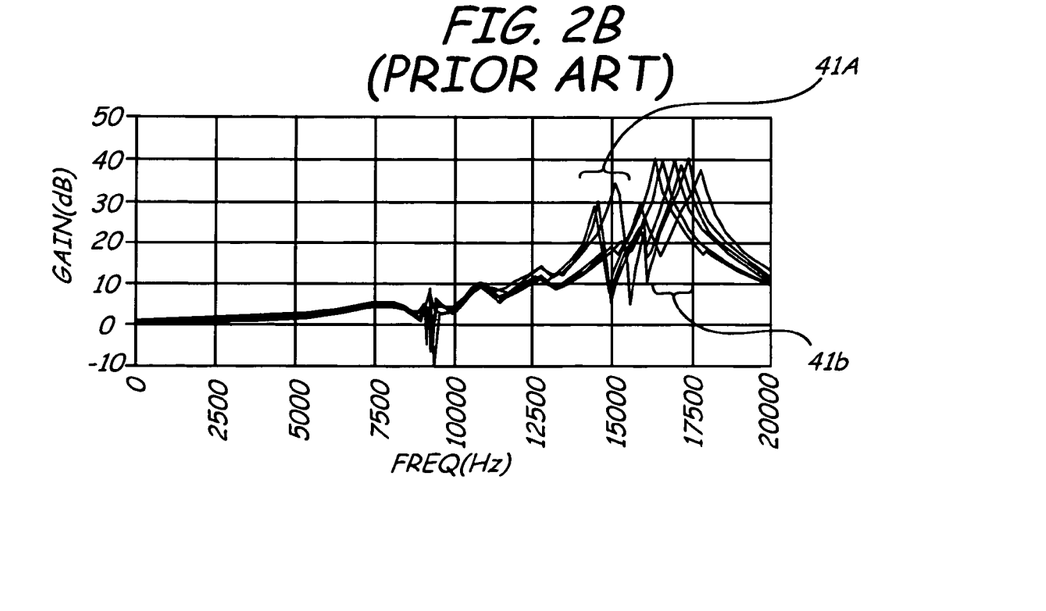
FIG. 2B is a graph representing resonance test data for ten HGAs mounted on the prior art mounting surface of FIG. 2A.

Resonance data can be obtained by shaking the block 40 and recording vibration modes. This can be accomplished by mounting the block 40 to a shaker motor, which shakes the test block 40 while a laser beam measures the motion of the slider on the HGA. The vibration modes of the HGA are then measured and recorded. FIG. 2B is a graph representing resonance test data for ten HGAs tested in this manner. The head gimbal assembly used for the testing in FIG. 2B do not include the features of the present invention. FIG. 2B shows gain (dB) versus frequency (Hz), and includes a region 41A and a region 41B.

When an HGA is mounted on the block 40, the standard boundary connection between the head gimbal assembly and the block 40 is most often two flat parallel surfaces in contact with each other. When HGAs are tested on the block 40 having a flat mounting surface 42, an inconsistent resonance mode is observed. In FIG. 2B, an inconsistent mode appears in region 41A, between about 14500 Hz and about 16000 Hz. A sway mode appears in region 41B, at about 17000 Hz. The resonance mode in region 41A has an unusually large amount of variation and has a complex mode shape, as determined by an experimental modal analysis. This resonance mode in region 41A tends to indicate a large amount of base plate twisting motion at about a 15000 Hz frequency.

Individual head gimbal assemblies may vary in their shape and profile. FIG. 2B indicates that the flat mounting surface 42 of the block 40 is associated with an unpredictable resonance mode at about 15 kHz (i.e., in the region 41A). Once the HGA is mounted on the flat surface, any variation in the shape and profile of the HGA may allow the HGA to rock or move during resonance testing. Should the HGA be mounted in a way that allows the HGA to move during testing, the test results are not repeatable and become difficult to predict. This provides an explanation for the unexpected resonance mode observed at about 15 kHz.

Figure 3A:
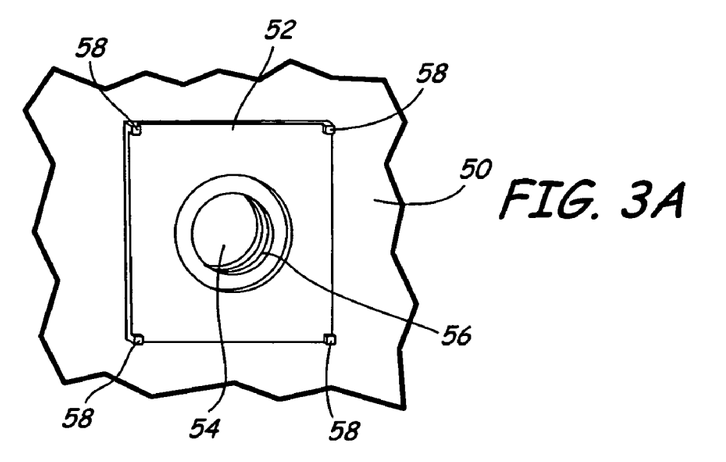
FIG. 3A is a top view of a mounting surface comprising raised pads.

FIG. 3A is a top view of a block 50 according to the present invention. Similar to block 40 illustrated in FIG. 2A, the block 50 of FIG. 3A comprises a raised mounting surface 52, center hole 54, and threaded bore 56. However, in contrast to the block 40 of FIG. 2A, the block 50 of FIG. 3 further comprises raised pads 58. Raised pads 58 provide a more stable interface between an HGA and the block 50.

Figure 3B:
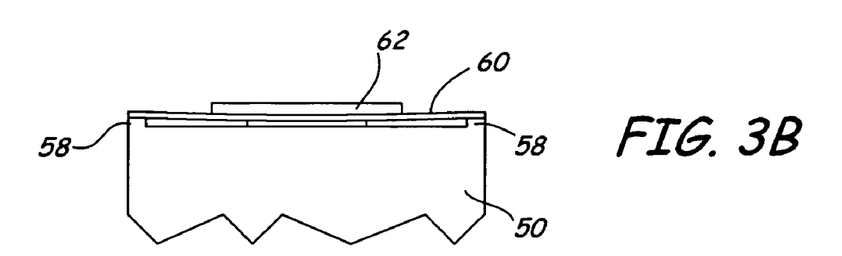
FIG. 3B is a side view of a head gimbal assembly mounted on a mounting surface having raised pads.

FIG. 3B is a side view of a head gimbal assembly 60 coupled to the block 50 at the raised pads 58. The HGA 60 is shown placed on the raised pads 58, and coupled to the block 50 using a screw 62.

By placing the HGA 60 on the block 50 so that the point of contact between the HGA 60 and the block 50 are the raised pads 58, the HGA 60 is more suitably coupled for controlling resonance modes of the HGA 60. Because the HGA 60 will contain variations in its shape and profile, using the raised pads 58 ensures that, when coupled with the block 50, the HGA 60 is less likely to rock or move, resulting in more repeatable test results. Similarly, because the HGA 60 connects to the test block 50 at the raised pads 58, any effects caused by the variation in the shape of the HGA 60 can be minimized.

Figure 3C:
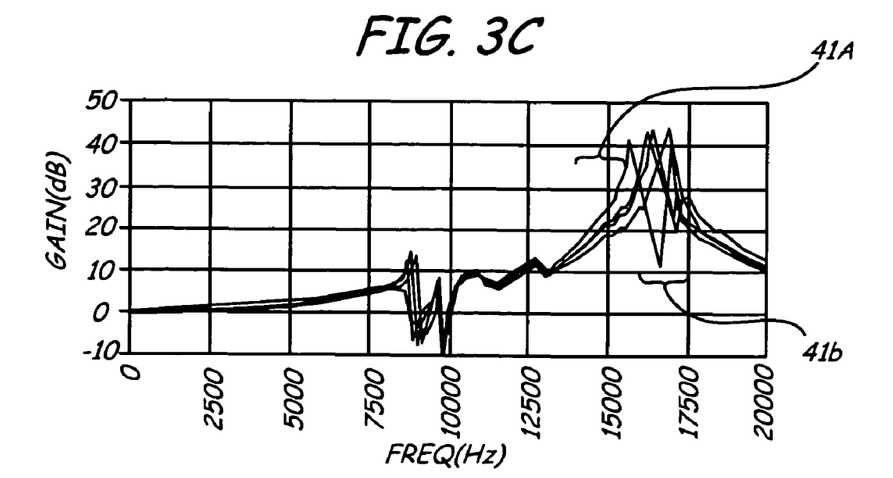
FIG. 3C is a graph representing resonance test data for ten HGAs mounted on the mounting surface as in FIG. 3B.

FIG. 3C is a graph representing resonance test data for ten HGAs mounted on the block 50. The head gimbal assembly and/or block include features of the present invention. The graph includes a first region 41A and a second region 41B. A sway mode appears in the region 41B. FIG. 3C shows that an HGA connected to the test block 50 at the raised pads 58 results in the absence of any mode except a sway mode at region 41B (i.e., at about 17 kHz). The improved mounting surface greatly improves the resonance performance of the HGA 60.

In addition to machining raised pads on a block, the raised pads may similarly be formed on a HGA in an effort to improve interface conditions between the HGA and any surface to which the HGA is coupled, such as a test block or an actuator arm. FIGS. 4A, 4B, 5A, and 5B illustrate exemplary embodiments incorporating the inventive features into the head gimbal assembly.

Figure 4A:
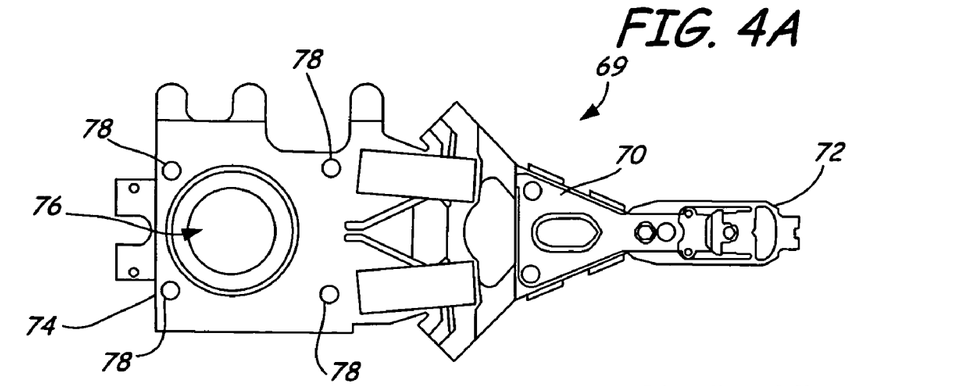
FIGS. 4A and 4B are top and side views, respectively, of a head gimbal assembly having integrated mounting features.
Figure 4B:
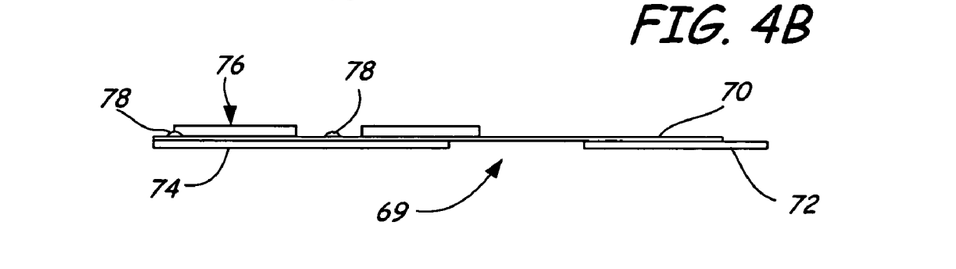

FIG. 4A is a top view of a head gimbal assembly (HGA) 69 according to the present invention. FIG. 4B is a side view of the HGA 69. The HGA 69 generally includes a load beam 70, a gimbal 72, and a base plate 74. The gimbal 72 attached at one end of the load beam 70. The base plate 74 can be attached at the other end of the load beam 70 or can be formed as a portion of the load beam 70 at the other end. The gimbal 72 is configured to carry a slider (not shown) and is located at a storage-medium-facing side of the HGA 69. The HGA 69 is configured to attach to an actuator arm (not shown) at the base plate 74 area. As such, the base plate 74 comprises a swage hole 76, which allows the HGA 69 to mechanically attach to an actuator arm swage boss at the hole 76. The HGA 69 can be coupled to a mounting location in a variety of other ways, including adhesive attachment, welding, and other mechanical connections. The load beam 70 further comprises four dimples (or pads) 78.

The dimples 78 on the HGA 69 serve to provide a desired interface between the HGA 69 and any surface to which the HGA 69 is coupled, such as a block or an actuator arm. Contact is made between the dimples 78 and any surface to which the HGA 69 is coupled. The dimples 78 can be arranged symmetrically about the swage hole 76. The dimples 78 may be formed using any suitable method. For instance, with respect to the HGA 69 illustrated in FIGS. 4A and 4B, the load beam 70 can be formed of a stainless steel material. As such, the dimples 78 can be formed by stamping the dimples 78 into the load beam 70 when the load beam is being fabricated. Though four dimples 78 are shown, the invention is not so limited. Any suitable number of dimples 78 may be formed at any suitable location and in any suitable arrangement on the HGA 69. For instance, the dimples 78 can be formed on the base plate 74.

Once again, the dimples 78 serve to provide a surface of the HGA 69, which improves the interface between the HGA 69 and a mounting surface. In particular, because the load beam 70 may not be formed perfectly flat, and may have some variation in its shape and profile, the formed dimples 78 help create an improved mounting surface, which can compensate for any such irregularities. This improved mounting surface in turn improves the resonance performance of the HGA 69.

Figure 5A:
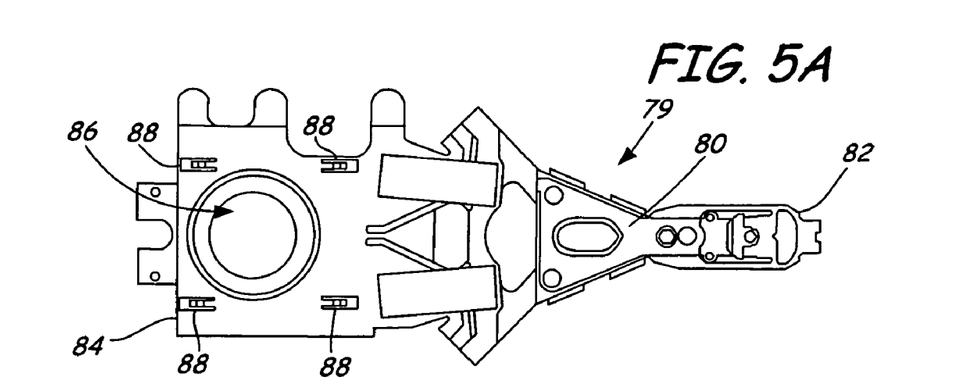
FIGS. 5A and 5B are top and side views, respectively, of a head gimbal assembly having integrated spring arms.
Figure 5B:
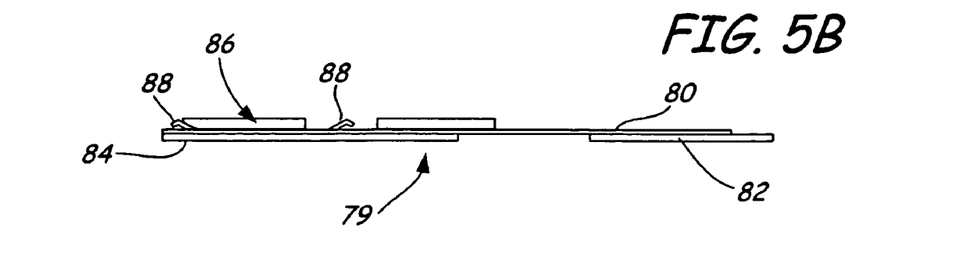

FIGS. 5A and 5B illustrate an alternate embodiment of the present invention. FIG. 5A is a top view and FIG. 5B is side view of a head gimbal assembly 79 having improved mounting features. Shown in FIGS. 5A and 5B are a load beam 80 having a gimbal 82 attached at one end and a base plate 84 attached to or formed as part of its other end. As described above, the base plate 84 comprises a swage hole 86, which allows the head gimbal assembly 79 to be coupled to an actuator arm in a disc drive. Formed on the load beam 80 are four formed spring arms 88.

Pre-formed spring arms 88 may be fabricated using any suitable method, such as performing an etching process on the load beam 80 and stamping the spring arms 88 to create the desired spring shape. A desired spring force can also be established during this fabrication process. Though four spring arms 88 are shown, the invention is not so limited. The number and placement of the springs 88 may vary based on resonance control features sought. For instance, the spring 88 can be located on the base plate 84.

Just as with the dimples 78 of FIGS. 4A and 4B, the formed spring arms 88 shown in FIGS. 5A and 5B create a surface in a mounting arrangement that compensates for any variation in the shape or profile of the HGA 79. Thus, when mounting the HGA 79 to any mounting surface, such as a test block or actuator arm, the spring arms 88 help to compensate for any variation in the shape or profile of the HGA 79.

Both the dimples or pads 78 and spring arms 88, when used in connection with a HGA mounting surface, improve the resonance features of the HGA 69 or 79. In particular, the dimples 78 and spring arms 88 help reduce the unpredictable and unexpected resonance peaks that can occur when the HGA 69 or 79 reaches a frequency of about 14 kHz to about 17 kHz. In addition, the dimples 78 and the spring arms 88 may be designed to control the pitch and roll static attitude of the HGA 69 or 79 when coupled to an actuator arm. Further, the dimples 78 and the spring arms 88 could be used to aid in the control of an adhesive, if an adhesive attach were used instead of a swaging, in connecting the HGA 69 or 79 to the actuator arm.

Figure 6A:
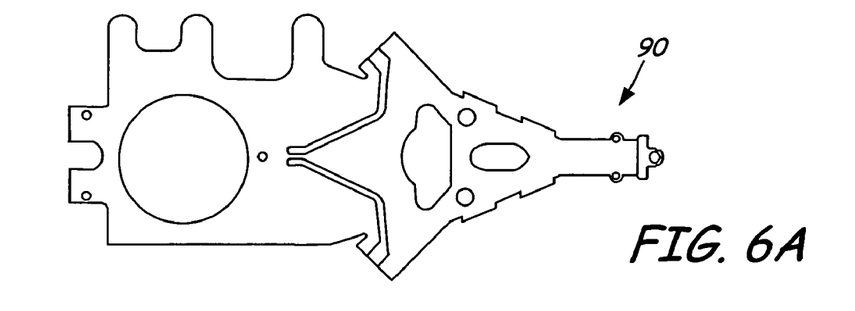
FIG. 6A is a top view of a bottom layer of a laminated load beam.
Figure 6B:
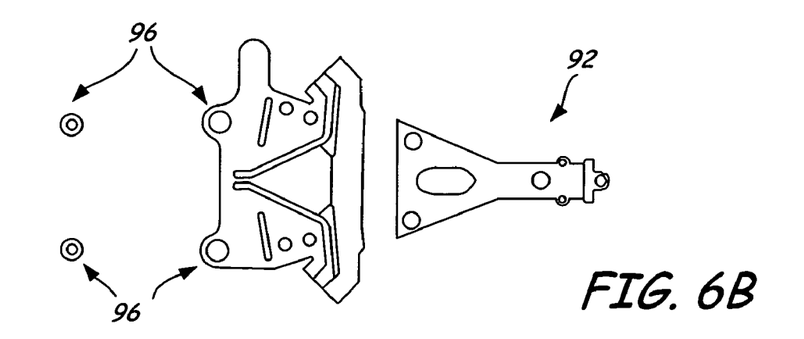
FIG. 6B is a top view of a top layer of a laminated load beam.
Figure 6C:
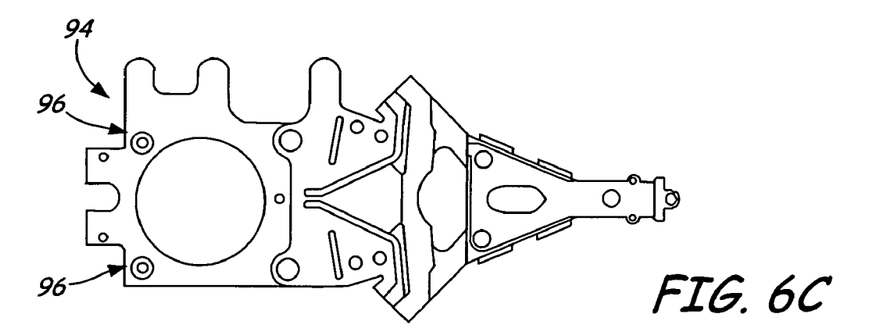
FIG. 6C is a top view of a laminated load beam with raised mounting pads.

FIGS. 6A, 6B and 6C illustrate yet another embodiment of the present invention. FIGS. 6A, 6B and 6C illustrate a laminated load beam incorporating features of the present invention. FIG. 6A is a top view of a bottom layer 90 of a laminated load beam. FIG. 6B illustrates the top layer 92 of a laminated load beam. FIG. 6C is a composite view of the top and bottom layers 90 and 92 that, together with a middle polyimide layer, form the laminated load beam 94. When forming the laminated load beam illustrated in FIGS. 6A, 6B and 6C, it is common to use a laminated material. The laminated material is typically a "sandwich" of three layers of material. The first layer of material is a thin layer of stainless steel, the middle material is a polyimide, and the bottom layer is also a thin layer of stainless steel. Though discussed in the terms of a laminated material containing stainless steel and polyimide, the invention is not so limited. Any suitable load beam material, or laminated material used to form the load beam, may be used in connection with the present invention.

When forming the laminated load beam 94, the top layer 92 and bottom layer 90 are formed using any suitable method. Most commonly, the top layer 92 and bottom layer 90 are formed using a series of masking and etching steps, or other suitable chemical or mechanical milling, etching, or other suitable processes. In forming the top layer 92, additional structures 96 can be designed and fabricated when etching the top layer 92. As such, when the exemplary load beam 94 is completed, four structures 96 appear on its mounting surface. As illustrated most clearly in FIG. 6B, the structures 96 may take any suitable shape, such as a "doughnut" shape. Alternately, the structures 96 may simply be formed as dimples, or as any other raised area on the top layer 92 of the load beam 94. The structures 96 function in much the same manner as the dimples and spring arms described with reference to FIGS. 4A, 4B, 5A, and 5B above.

Figure 7:
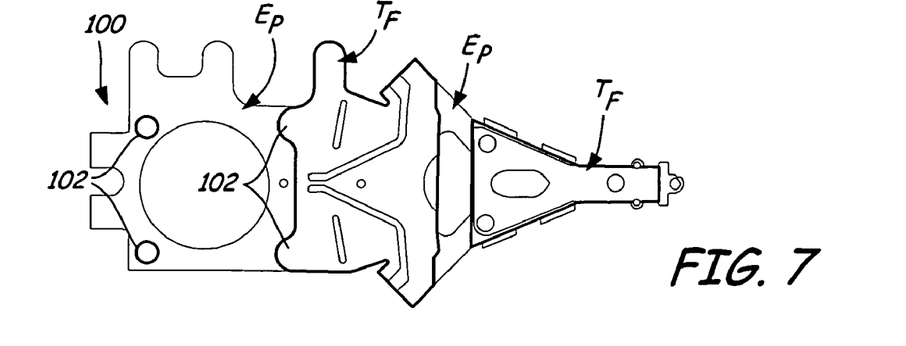
FIG. 7 is a top view of a partially etched load beam having mounting pads.

In addition to separately formed features, the present invention can be incorporated into the load beam design using any suitable method. FIG. 7 is a top view of a partially etched load beam 100. In etching the load beam 100, full thickness regions $T_F$ can be created on the load beam, in addition to partially etched regions $E_P$. Raised pads can be created by partially etching the material around the end pads to leave only small surfaces 102. In this way, the small surfaces 102 create the mounting surfaces for the load beam 100.

Figure 8:
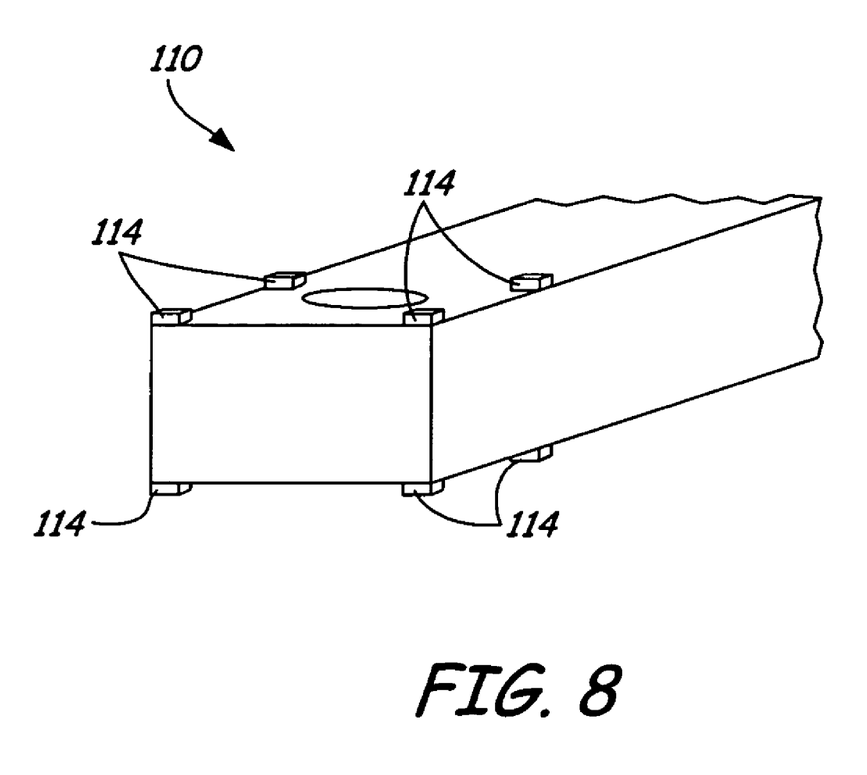
FIG. 8 is a partial perspective view of an actuator arm.

Lastly, the mounting features of the present invention may be incorporated into an actuator arm, which can be coupled to an HGA. FIG. 8 is a partial perspective view of an actuator arm 110 for use in a disc drive. Located on the distal end 112 of the actuator arm 110 are a plurality of raised mounting pads 114. The mounting pads 114 provide a raised location on the actuator arm 110 at which a HGA can be coupled. Similar to the raised pads 58, dimples 78, springs 88 and mounting structures 96, the mounting pads 114 compensate for any variations in the shape or profile of the HGA once the HGA is attached to the actuator arm 110. In this way, the raised pads 114 provide a more consistent mounting surface when connecting a HGA to the actuator arm 110.

Although the present invention has been described with reference to preferred embodiments, workers skilled in the art will recognize that changes may be made in form and detail without departing from the spirit and scope of the invention.

The invention claimed is:

1. An interface for improving resonance control, the interface comprising:
a first member having a first coupling portion;
a mounting surface having a second coupling portion;
a mechanical connection coupling the second coupling portion of the mounting surface to the first coupling portion of the first member in a cantilevered configuration; and
at least three raised engagement members located on at least one of the first member or the mounting surface for providing contact between the first member and the mounting surface, wherein the raised engagement members are positioned about and spaced from the mechanical connection between the second coupling portion of the mounting surface and the first coupling portion of the first member such that the first and second coupling portions are spaced from each other adjacent to the raised engagement members.

2. The interface of claim 1, wherein the raised engagement members each comprise a circular pad.

3. The interface of claim 1, wherein at least one raised engagement member comprises a spring.

4. The interface of claim 1, wherein the mounting surface corresponds to a block.

5. The interface of claim 4, wherein the raised engagement members are each located on the block.

6. The interface of claim 1, wherein the mounting surface corresponds to an actuator arm.

7. The interface of claim 6, wherein the raised engagement surface is located on the actuator arm.

8. The interface of claim 1, wherein the first member is selected form the group consisting of: a head gimbal assembly, a load beam, and a suspension assembly.

9. The interface of claim 8, wherein the raised engagement members are all located on the first member.

10. The interface of claim 1, wherein at least four raised engagement members are provided.

11. The interface of claim 1, wherein the raised engagement members are substantially equally spaced about the mechanical connection.

12. The interface of claim 1, wherein the first member comprises a head gimbal assembly, and wherein the at least three raised engagement members are located on a base plate portion of the head gimbal assembly.

13. The interface of claim 1, wherein the first member comprises a head gimbal assembly, and wherein the at least three raised engagement members are located on a load beam portion of the head gimbal assembly.

\* \* \* \* \*

UNITED STATES PATENT AND TRADEMARK OFFICE
CERTIFICATE OF CORRECTION

| | | |
|---|---|---|
| PATENT NO. | : 7,663,841 B2 | Page 1 of 1 |
| APPLICATION NO. | : 11/068282 | |
| DATED | : February 16, 2010 | |
| INVENTOR(S) | : Budde et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 556 days.

Signed and Sealed this

Thirtieth Day of November, 2010

David J. Kappos
*Director of the United States Patent and Trademark Office*